United States Patent [19]

Ibamoto et al.

[11] Patent Number: 5,031,479
[45] Date of Patent: Jul. 16, 1991

[54] AUTOMATIC GEAR CHANGE CONTROL APPARATUS FOR AUTOMOBILE AND METHOD OF CONTROLLING SAME

[75] Inventors: Masahiko Ibamoto; Keiichi Tokuyama; Hiroyuki Ohiwa; Hiroshi Kimura; Mitsuhiro Masuda, all of Katsuta, Japan

[73] Assignee: Hitachi, Ltd., Tokyo, Japan

[21] Appl. No.: 532,673

[22] Filed: Jun. 4, 1990

[30] Foreign Application Priority Data

Jun. 12, 1989 [JP] Japan .................. 1-146806

[51] Int. Cl.$^5$ ............................................. B60K 41/06
[52] U.S. Cl. ........................................ 74/857; 74/866
[58] Field of Search ............. 74/856, 857, 861, 866; 364/424.1

[56] References Cited

U.S. PATENT DOCUMENTS

| | | | |
|---|---|---|---|
| 3,763,720 | 10/1973 | Aono et al. | 74/857 |
| 4,266,447 | 5/1981 | Heess et al. | 74/866 X |
| 4,403,527 | 9/1983 | Mohl et al. | 74/866 X |
| 4,667,540 | 5/1987 | Yagi | 74/866 |
| 4,691,285 | 9/1987 | Takeda | 364/424.1 |
| 4,838,124 | 6/1989 | Hamano et al. | 74/857 X |
| 4,933,851 | 6/1990 | Ito et al. | 364/424.1 |

FOREIGN PATENT DOCUMENTS

| | | |
|---|---|---|
| 3142713 | 5/1983 | Fed. Rep. of Germany . |
| 3151252 | 7/1983 | Fed. Rep. of Germany . |
| 3542146 | 6/1986 | Fed. Rep. of Germany . |
| 388340 | 6/1989 | Fed. Rep. of Germany . |
| 69738 | 5/1980 | Japan . |
| 39925 | 4/1981 | Japan . |
| 44331 | 2/1989 | Japan . |
| 85844 | 3/1989 | Japan . |
| 182660 | 7/1989 | Japan . |

*Primary Examiner*—Dwight Diehl
*Attorney, Agent, or Firm*—Antonelli, Terry, Stout & Kraus

[57] ABSTRACT

There are disclosed an automatic gear change control apparatus for an automobile and a method of controlling such apparatus. A rotational output of an internal combustion engine is connected to drive wheels of the automobile and a load device. When a gear shifting-up of an automatic transmission is to be effected, the load applied by the load device is increased, or the load is connected to an output rotation shaft of the engine via a selectively-connecting device, thereby reducing the rotational speed of the output rotation shaft of the engine to a required level.

2 Claims, 6 Drawing Sheets

AUTOMATIC GEAR CHANGE CONTROL APPARATUS FOR AUTOMOBILE AND METHOD OF CONTROLLING SAME

BACKGROUND OF THE

This invention relates to an automatic gear change control apparatus for an automobile and a method of controlling such apparatus, and more particularly to an automatic gear change control apparatus capable of reducing a shock (jolt) due to a gear change (gear shift) and a method of controlling such apparatus.

It is already known, for example, from Japanese Unexamined Patent Publication No. 56-39925 (corresponding to U.S. Pat. No. 4,403,527) to control the output of an engine during a gear change of a transmission in order to reduce a shock occurring at the time of the gear change such as gear shift-up or shift-down. Such methods of controlling the engine output are mostly either to control the opening and closing of a throttle valve or to control a valve opening-time of a fuel injector valve or an ignition timing.

Japanese Unexamined Patent Publication No. 55-69738 (corresponding to U.S. Pat. No. 4,266,447) discloses an automatic gear change control apparatus in which a jolt (gear-change shock) control-starting speed (nlnA) and a terminating speed (nlnE) are calculated from the rotational speed of the engine obtained when starting the gear shifting, and the output torque is controlled during a period when the rotational speed of the engine actually changes from the speed nlnA to the speed nlnE.

However, in the above conventional automatic gear change control apparatuses, although it is possible to reduce the engine output particularly when shifting up the gear, it is not possible to abruptly emit the rotational energy so far stored. Actually, it is difficult to lower the rotational speed of the engine to a required level in a short time period of the gear shifting, particularly at the time of gear shifting-up during acceleration. Namely, in the above prior art, although it is necessary to reduce a difference between the rotational speeds of the opposite sides of a clutch in order to reduce a gear-change shock in the automatic transmission, a braking force is not positively applied to the engine, and it is difficult to lower the engine rotational speed to the target speed in a short time. Therefore, the above prior art has a problem that it is impossible to sufficiently suppress the gear-change shock.

SUMMARY OF THE INVENTION

With the above problems of the prior art in view, it is an object of this invention to provide an automatic gear change control apparatus and a method of controlling such apparatus, by which the rotational speed of the engine can be rapidly lowered to a required level in a short time, thereby sufficiently suppressing a gear change shock.

According to one aspect of the present invention, there is provided a method of controlling a gear change of an automobile, the automobile comprising an internal combustion engine; an automatic transmission connected to an output rotation shaft of the engine so as to transmit the rotational output of the engine to drive wheels of the automobile through any selected one of a plurality of gear ratios; a load device selectively connectable to the output rotation shaft of the engine via selectively-connecting means; and means for generating a gear change control signal for selecting one of the gear ratios of the automatic transmission in accordance with one of operational conditions of the automobile and the engine; the method comprising the steps of:

controlling the selectively-connecting means when the gear change signal-generating means generates the control signal for shifting up the gear in the automatic transmission, in such a manner that the selectively-connecting means connects the load device to the output rotation shaft of the engine.

According to another aspect of the present invention, there is provided an automatic gear change control apparatus for an automobile, the automobile comprising an internal combustion engine; an automatic transmission connected to an output rotation shaft of the engine so as to transmit the rotational output of the engine to drive wheels of the automobile through any selected one of a plurality of gear ratios; the apparatus comprising:

a load device for applying a load;

means for connecting the load device to the output rotation shaft of the engine and for generating a gear change control signal for selecting one of the gear ratios of the automatic transmission in accordance with one of operational conditions of the automobile and the engine; and load control means for increasing the load of the load device when the gear change signal-generating means generates the control signal for shifting up the gear in the automatic transmission.

In the above method and apparatus of the present invention, the rotational output of the internal combustion engine is transmitted to the drive wheels of the automobile via the automatic transmission, and also the rotational output of the internal combustion engine is connected to the load device. When the gear shifting-up of the automatic transmission is to be effected, the load of the load device is increased, or the load device is connected to the output rotation shaft of the engine via the selectively-connecting means. Therefore, the rotational speed of the output rotation shaft of the engine is rapidly lowered or reduced to a required level by the energy-absorbing action of the load device, so that the rotational speeds of the opposite side of the clutch, connected to the gear of the automatic transmission, are made equal to each other, thereby achieving the gear shifting (gear change) without causing a shock.

DESCRIPTION OF THE PREFERRED EMBODIMENTS OF THE INVENTION

The invention will now be described with reference to the drawings.

Figure 1:
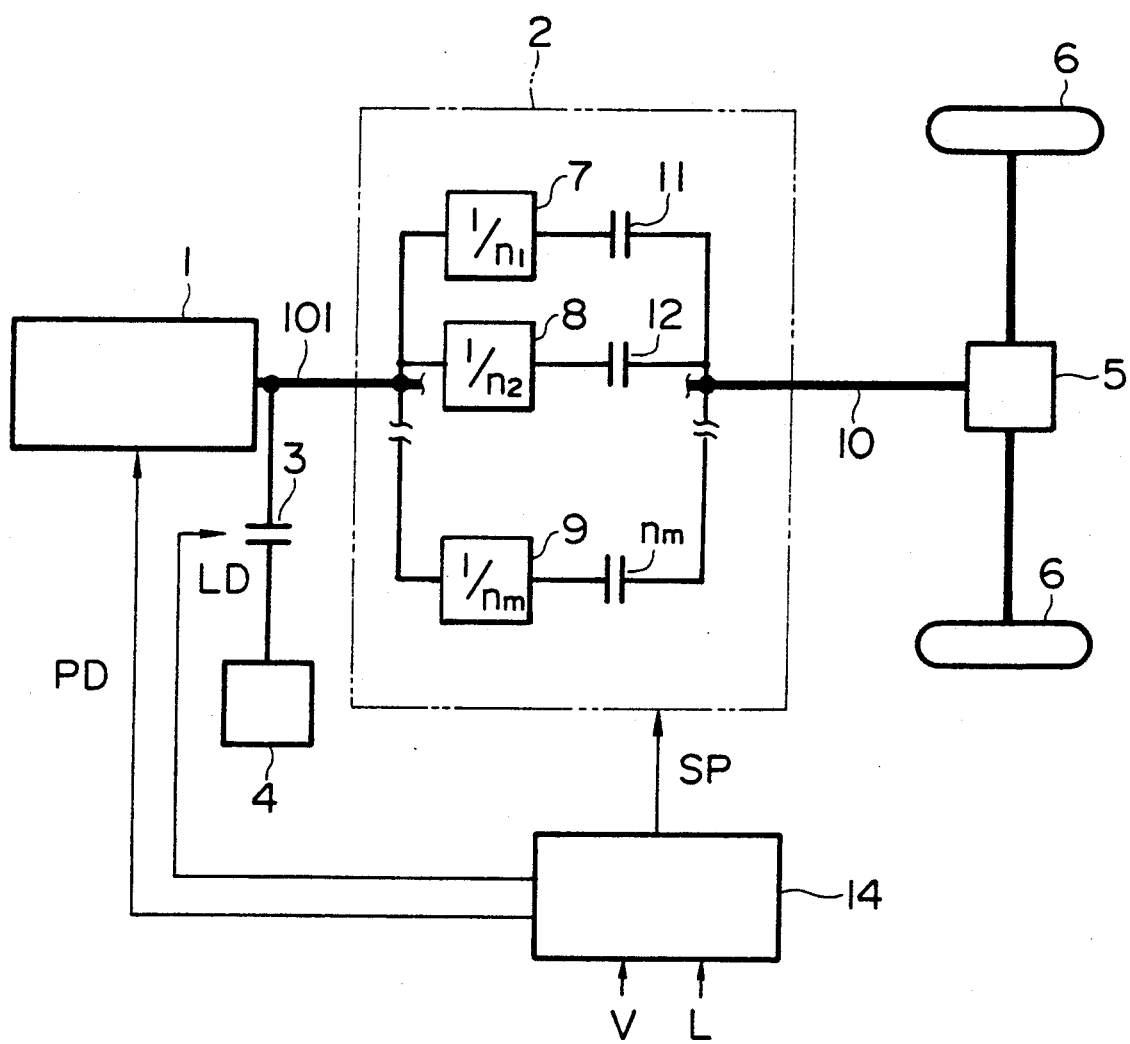
FIG. 1 is a block diagram of the first embodiment according to the present invention.

FIG. 1 shows an automatic gear change control apparatus for an automobile according to a first embodiment of the present invention. An engine 1 of the automobile includes an output rotation shaft 101. The rotation output exerted on the output rotation shaft 101 of the engine 1 is inputted into an automatic transmission 2, and is also connected to a load device 4 via a load-applying clutch 3. The output of the automatic transmission 2 is also connected via its output shaft 10 and a differential device 5 to drive wheels 6 for propelling the automobile.

A common form of the automatic transmission 2 comprises planetary gears and hydraulic clutches, and these are schematically shown as a plurality of gears 7 to 9 having respective reduction ratios of 1/nl to 1/nm and clutches 11 to nm for connecting these gears to the output shaft 10.

A transmission control device 14 outputs a shift control signal SP to the automatic transmission 2 so as to control the gear shifting of the automatic transmission 2. Generally, a running speed (vehicle speed) V of the automobile, a throttle opening degree L representative of the engine load, and etc., are inputted to the transmission control device 14. In addition to the above shift control signal SP, the transmission control device 14 outputs a load-applying signal LD for controlling the operation (engagement and disengagement) of the load-applying clutch 3 so as to apply the load, and an engine control signal PD for controlling the output of the engine 1.

In the above automatic gear change control apparatus, reference is now made to the case where the shifting-up of the gear is to be effected during the running of the automobile, with the clutch 11 engaged. First, assuming that the speed of rotation of the engine 1 in the engaged condition of the clutch 11 is N1, the rotational speed of the clutch 11 is N1/nl. The output side of another clutch 12 idles at the same rotational speed. Here, when disengaging the clutch 11 for effecting the shifting-up, the power (rotational torque) of the engine 1 ceases to be transmitted to the drive wheels 6. However, since the inertia of the vehicle body is large, the vehicle speed V is not lowered if this time period is short, and therefore the rotational speed N1/nl is maintained at the output sides of the clutches 11 and 12.

Next, the clutch 12 is to be engaged. At this time, if the engine rotational speed remains N1, a difference between the rotational speeds of the opposite sides of the clutch 12 is $(1/n2 - 1/nl) \cdot N$ since the rotational speed of the input side of the clutch 12 is N1/n2. If the clutch 12 is engaged in this condition, a gear-change shock (jolt) occurs. Therefore, when the engine rotational speed N is lowered to N2 which is equal to $(n2/nl) \cdot N1$, the rotational speed of the input side of the clutch 12 is N2/n2 which is equal to N1/nl. Thus, the rotational speed of the input side of the clutch 12 becomes equal to the rotational speed of the output side thereof, thereby preventing a gear-change shock or jolt. Since this sequential operation is carried out in a short shift-up time of about 0.5 seconds, the rotational speed N of the engine 1 is also required to rapidly change from N1 to N2 in such a short time of about 0.5 seconds.

However, unlike an electric motor, the engine 1 can not recover the rotational energy, stored in the moment of inertia possessed by the engine itself, in a fuel system serving as an energy source. Therefore, although the engine output can be lowered by a stop of fuel supply or the adjustment of an ignition timing (specifically, the shifting of the ignition timing to the delay side), it is impossible, only with such means, to rapidly lower the engine rotational speed without wasting the rotational energy so far stored.

Accordingly, in the present invention, it is intended to positively absorb the energy, stored in the engine, by means of another load so as to positively lower the engine rotational speed during the short time period of the gear shifting-up, thereby reducing a shock occurring during the gear shifting-up. More specifically, the transmission control device 14 outputs the shift control signal SP, representing the shifting-up of the gear from a first to a second position, so as to disengage the clutch 11, and at the same time outputs the load-applying signal LD and the engine control signal PD as described above. The load-applying signal LD changes the load-applying clutch 3 from a disengaged condition to an engaged condition so as to connect the load device 4 to the output rotation shaft 101 of the engine 1. Preferably, the load device 4 should be of the type which can be intermittently operated without any problem and can apply a load proportional to the engine speed. Examples of such type are a compressor for an air conditioner, and an air compressor for controlling a suspension. For example, in such an air conditioner compressor, the pressure increases in proportion to the engine speed, and therefore the load torque is substantially proportional to the engine speed, and desirable results can be obtained.

This will now be described in further detail. Here, the angular velocity of the rotation of the engine 1 is $\omega 1$, and in this condition, when the clutch 11 is disengaged so as to shift up the gear, the rotational energy Er stored in the engine 1 is expressed by the following formula:

$$ER = \tfrac{1}{2} \cdot I\omega 1^2 \qquad (1)$$

where I represents the moment of inertia possessed by the engine 1.

Next, it is necessary to reduce the angular velocity to $\omega 2$ during a time period t at the end of which the engagement of the clutch 12 is completed. The load torque T required for this is calculated in the following:

$$\tfrac{1}{2} \cdot I \cdot (\omega 1^2 - \omega 2^2) = (\omega 1 - \omega 2)Tt \qquad (2)$$

$$T = \frac{1}{2t} \cdot I \cdot (1 + 2) \qquad (3)$$

when effecting the shifting-up in a relatively high range of the rotational speed of the engine, a high load torque is required. A compressor for an air condition is suited for this purpose.

The above engine control signal reduces the outout of the engine 1, for example, by temporarily stopping the operation of the injector to stop the supply of fuel to the engine 1, or by temporarily closing the throttle valve to temporarily delay the ignition timing.

Next, a second embodiment of the present invention will now be described with reference to FIG. 2. In this embodiment, a generator for charging a battery is used as a load device. In this embodiment, an output rotation shaft 101 of an engine 1 is directly connected at one end to an input shaft of an automatic transmission 2a, and there is not provided a load-applying clutch for connecting and disconnecting the output rotation shaft 101 of the engine relative to the load device. Instead, a pulley 102 is mounted on the other end of the output rotation shaft 101 of the engine 1, and a belt 103 is extended around the pulley 102 and a pulley 104. The output rotation shaft 101 is adapted to normally drive or rotate a rotor of the generator 15 via the pulleys 102 and 104 and the belt 103, the generator 15 serving to charge the battery 15. A regulator 17 controls the electric power generated by the generator 15. The regulator 17 receives a load-applying signal LD from a transmission control device 14a similar to that of the preceding embodiment of FIG. 1, and outputs a generation control signal GCS to the generator 15 so as to control the generation of electric power.

In the above automatic gear change control apparatus of this embodiment, when the gear of the automatic transmission 2a is to be shifted up, the transmission control device 14a outputs a shift control signal SP to disengage a clutch 11 of the automatic transmission 2a, and also outputs the load-applying signal LD to the regulator 17. The regulator 17 normally controls the generator 15 (for example, field winding current or the like of the generator 15) so as to charge the battery 16 at a constant voltage. However, the regulator 17, when receiving the load-applying signal LD, outputs the generation control signal GCS so as to increase the amount of generation of electric power of the generator 15. Such increased portion of the electric power is so predetermined as to correspond to the engine rotational speed N obtained when starting the shifting-up, and causes the rotational speeds of the opposite sides of the clutch (for example, the clutch 12 in FIG. 1) in the automatic transmission 2a to become equal to each other during a gear-change time of about 0.5 seconds. More specifically, the rotational speed of the output rotation shaft 101 of the engine 1 is lowered to meet the rotational speed of the output side of the clutch. As a result, the amount of generation of electric power of the generator 15 is increased, and therefore a larger charge current flows into the battery 16. However, this time period is very short on the order of about 0.5 seconds as described above, and therefore there is particularly no problem. Then, when the opposite sides of the clutch are thus synchronized with each other during the above predetermined gear-change time, the transmission control device 14a feeds an instruction for engaging, for example, the 2nd-speed clutch 12 (FIG. 1), thus completing the shifting-up from the 1st-speed position to the 2nd-speed position.

Figure 2:
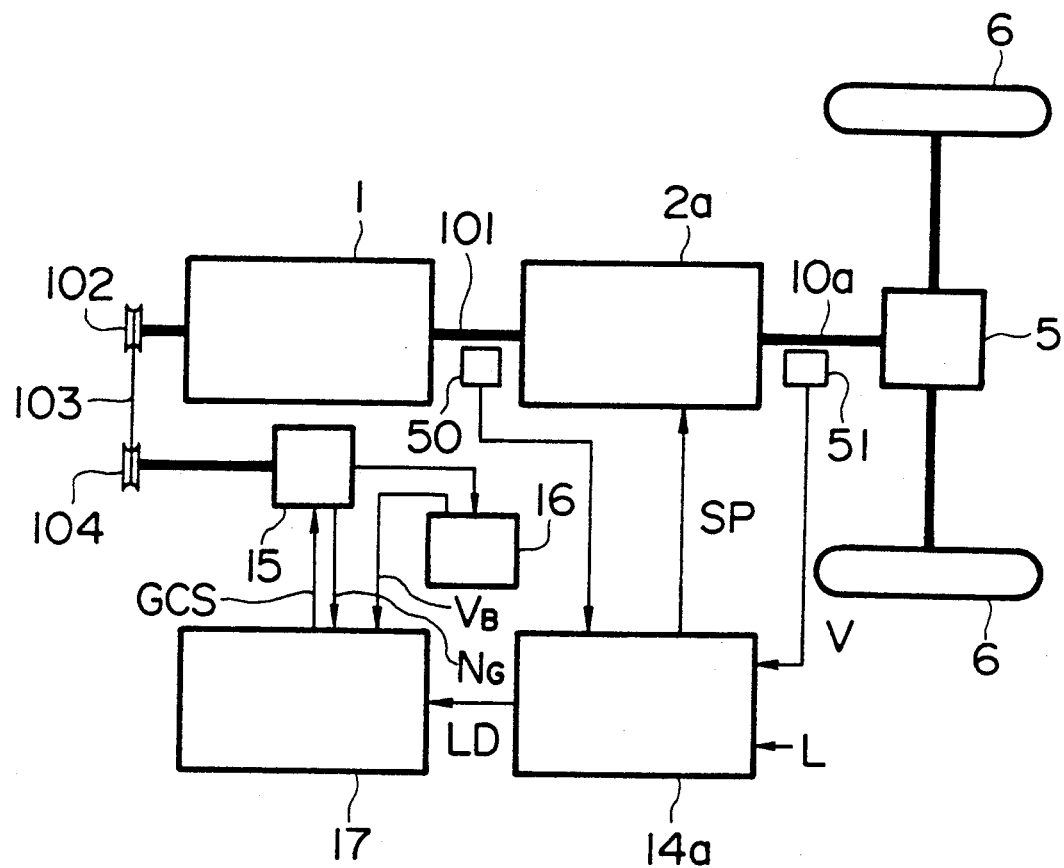
FIG. 2 is a block diagram of the second embodiment according to the present invention.

As shown in FIG. 2, the transmission control device 14a is further provided with an engine rotation sensor 50 for detecting the engine rotational speed N, a vehicle speed sensor 51 for detecting the running speed of the automobile. In accordance with the above-mentioned formula (3), the transmission control device 14a can calculate the optimum load torque from these detected values obtained at the time of starting the gear change. Further, since the battery voltage VB and the rotational frequency NG of the generator are inputted into the regulator 17, it is possible to calculate a generator-energizing current required for producing the above optimum load torque. Thus, in the system of this embodiment, the optimum load torque can be produced depending on the speed to which the gear is changed, and therefore the gear change involving only a small shock can always be effected even when the point of the gear change is varied depending on the circumstances of the running of the automobile.

Figure 3:
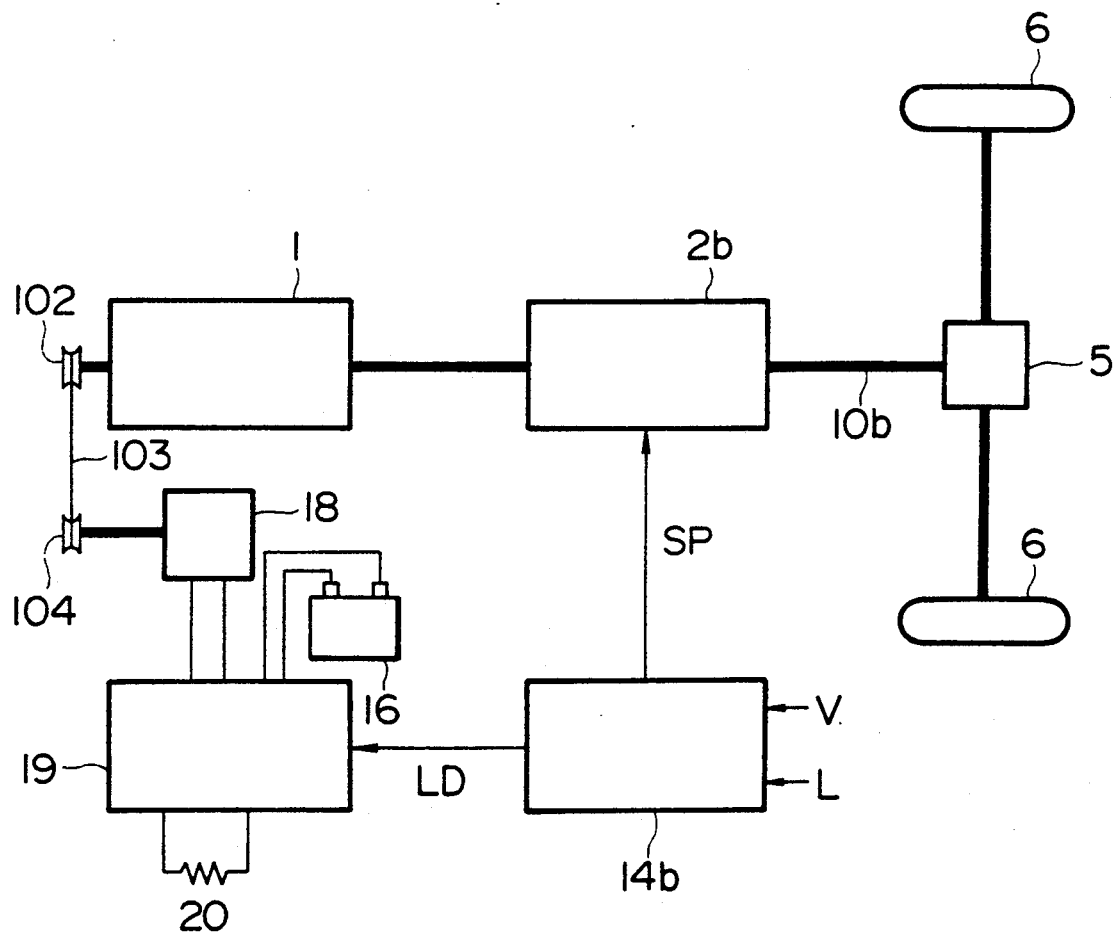
FIG. 3 is a block diagram of the third embodiment according to the present invention.

FIG. 3 shows a third embodiment of the invention. In this embodiment, there is employed a generator-motor 18 which is originally provided for absorbing vibrations produced when an engine 1 is idling. In this embodiment, it is intended to relieve or reduce a gear-change shock, utilizing the generator-motor 18. More specifically, upon receipt of a damping signal from a damper control unit 19, the generator-motor 18 functions as a generator to convert a rotational output energy of the engine 1 into electric power so as to absorb it. In contrast, the generator-motor 18 also functions as an electric motor so as to apply rotational energy to the engine 1 via pulleys 102 and 104 and a belt 103. More specifically, when the engine 1 is disconnected from an output shaft 10 during the idling thereof and is supported on a support member of rubber or a spring in a free condition, the damper control unit 19 prevents mechanical vibrations of the engine 1 due to lowering or irregularity of a combustion cycle. For this reason, a bi-directional semi-conductor converter circuit is incorporated in the damper control unit 19. When supplying the rotational energy to the engine 1, this bi-directional semi-conductor converter circuit causes the generator-motor 18 to function as an electric motor, and at this time, depending on whether this electric motor is a dc motor or an ac motor, this converter circuit functions as a chopper or an inverter for converting the battery voltage. On the other hand, when absorbing the rotational output energy of the engine 1, the above converter circuit causes the generator-motor 18 to function as a generator, and at this time time converter circuit functions as a step-up chopper or a converter for recovering the generated electric power in the battery 16. When the converter circuit can not fully recover the generated electric power in the battery 16, the converter circuit causes a load resistor 20 to consume the energy.

In this embodiment, the damper control unit 19 can freely supply and absorb the energy via the generator-motor 18, and therefore the opposite ends of the clutch can be synchronized with each other accurately and rapidly, thereby positively eliminating a gear-change shock. Originally, the damper control unit 19 is used only when the engine 1 is idling, and is not necessary during the running of the automobile. However, as in this embodiment, by utilizing the damper control unit 19 as the load for lowering the engine rotational speed at the time of the gear shifting-up, the efficiency of use of the damper control unit 19 is advantageously enhanced.

The operation of the automatic gear change control apparatus of this embodiment will now be described. First, a transmission control device 14b outputs a shift control signal SP to disengage a clutch (not shown) in an automatic transmission 2b. At the same time, the transmission control device 14b outputs a load-applying signal LD to the damper control unit 19. The load-applying signal LD is not a mere ON/OFF signal, but is representative of the value of the load torque T calculated from the engine rotational speed N, obtained immediately before the gear change, in accordance with the above formula (3), and is also representative of a time period t at the end of which the engagement of the next clutch is completed. Upon receipt of the load-applying signal LD, the damper control unit 19 controls the current of the generator-motor 18 in such a manner that the torque T is applied to the engine 1 for the time period t. In the above control, instead of controlling the generator-motor 18 for the given time period t, a target value (represented by the angular velocity ω2) of the rotational frequency of the engine may be given so that the control is effected until the engine rotational frequency actually reaches this target value. However, in order that the driver of the automobile may not have a feeling of idle running, the above time period t should be not more than 0.5 seconds.

Figure 4:
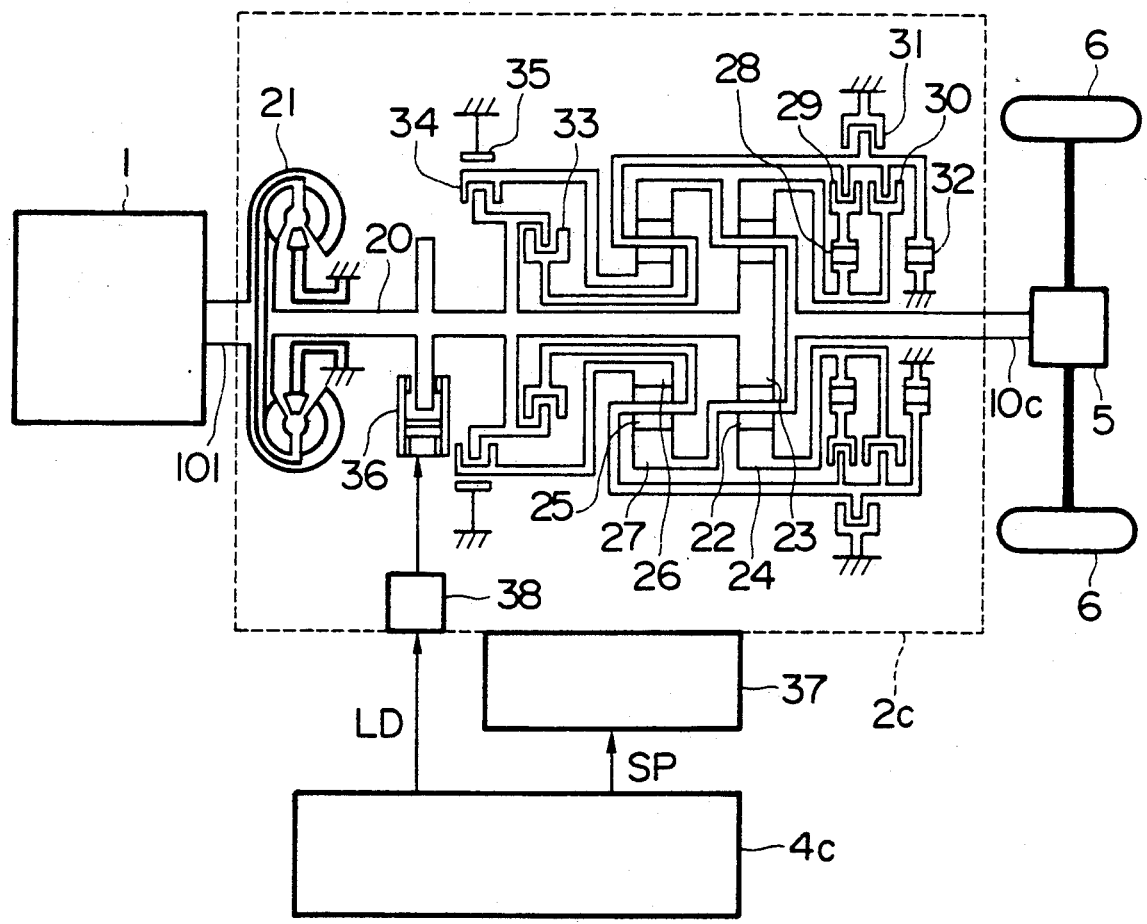
FIG. 4 is diagramatic view of the third embodiment according to the present invention.

FIG. 4 shows a fourth embodiment of the invention. In this embodiment, a brake device is mounted directly on an input shaft 20 of an automatic transmission 2c connected to an output rotation shaft 101 of an engine 1. The automatic transmission 2c is different in construction from the automatic transmission of FIG. 1 having the plurality of parallel gears of reduction ratios n1 to nm. The internal structure of the automatic transmission 2c is cross-sectionally shown in FIG. 4. More specifically, as is clear from FIG. 4, the automatic transmission 2c employs a plurality of planetary gears, and constitutes three to four forward gears and one reverse gear with a small number of component parts. Namely, the Output of the engine 1 is inputted to the automatic transmission 2c via the output rotation shaft 101, and within the automatic transmission 2c, the engine output is further transmitted via a torque converter 21 and the input shaft 20 thereof to rotate a sun gear 23 in mesh with planetary gears 22 of a rear train. The planetary gears 22 are connected to an output shaft 10c, and also are connected to an internal gear 27 in mesh with planetary gears 25 of a front train so as to rotate therewith. An internal gear 24 of the rear train is engageable with the planetary gears 25 of the front train via a forward one-way clutch 28, a forward clutch 29 and an overrun clutch 30. The planetary gears 25 of the front train can be fixed to a speed of zero by a low-and-reverse brake 31 and a low one-way clutch 32, and also can be coupled to an output shaft of the torque converter 21 via a high clutch 33. A sun gear 26 of the front train can be coupled to the output shaft of the torque converter 21 via a reverse clutch 34, and also can be fixed to a speed of zero by a brake band 35.

Thus, the automatic transmission carries out the gear change by selectively connecting and fixing the elements of the two sets of planetary gears by the four clutches, the two brakes and the two one-way clutches. Anyway, when the gear shifting-up is to be effected, it is indispensable that the rotational speeds of the input and output sides of the clutch to be engaged should be made equal to each other in order to reduce a gear-change shock. Therefore, it is necessary to abruptly lower the rotational speed of the input shaft 20 of the torque converter 21. For this reason, in this embodiment, a shift-up brake 36 is additionally provided. More specifically, when the gear shifting-up is to be effected, a transmission control device 14c feeds, to a hydraulic control portion 37, an instruction SP for disengaging the clutch now engaged. At the same time, the transmission control device 14c feeds an instruction LD to a hydraulic valve 38 to abruptly operate the shift-up brake 36. Then, when the rotational speed of the input shaft 20 of the torque converter 21 is lowered to an appropriate value, the shift-up brake 36 is loosened, and the next clutch is slowly engaged. The braking force of the shift-up brake 36 (that is, the pressure of the hydraulic valve 38) is programmed to be applied for each gear-shifting stage so that the above sequential control can be carried out within 0.5 seconds.

Namely, in this embodiment, the optimum braking force can be applied for each gear-shifting stage of the automatic transmission, and therefore the gear-change shock can be always kept to a minimum. Further, the load is not applied directly to the engine 1, but is applied thereto via the torque converter 21. Therefore, advantageously, the abrupt braking during the gear shifting is alleviated by the torque converter 21, and an undue load is not applied to the engine 1.

Figure 5:
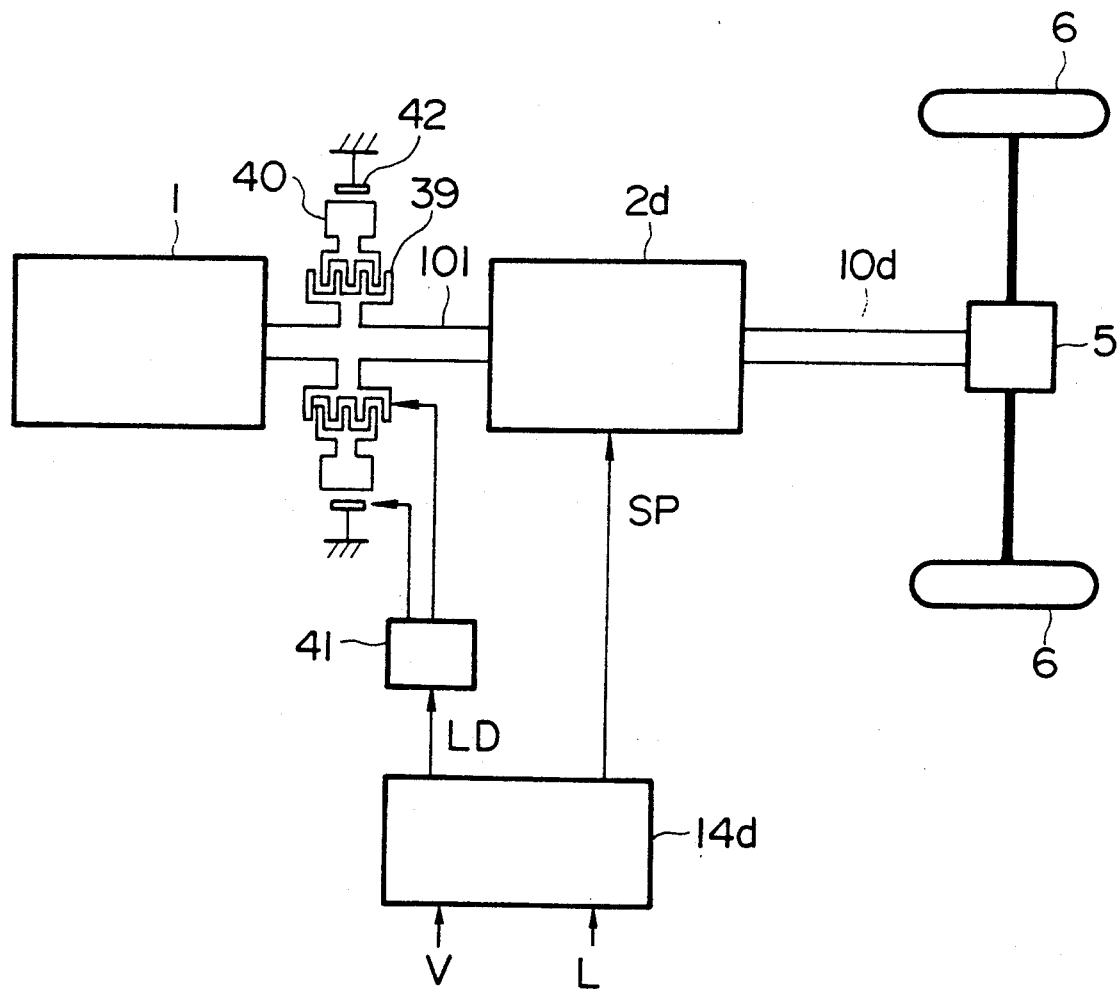
FIG. 5 is diagramatic view of the fifth embodiment according to the present invention.
Figure 6:
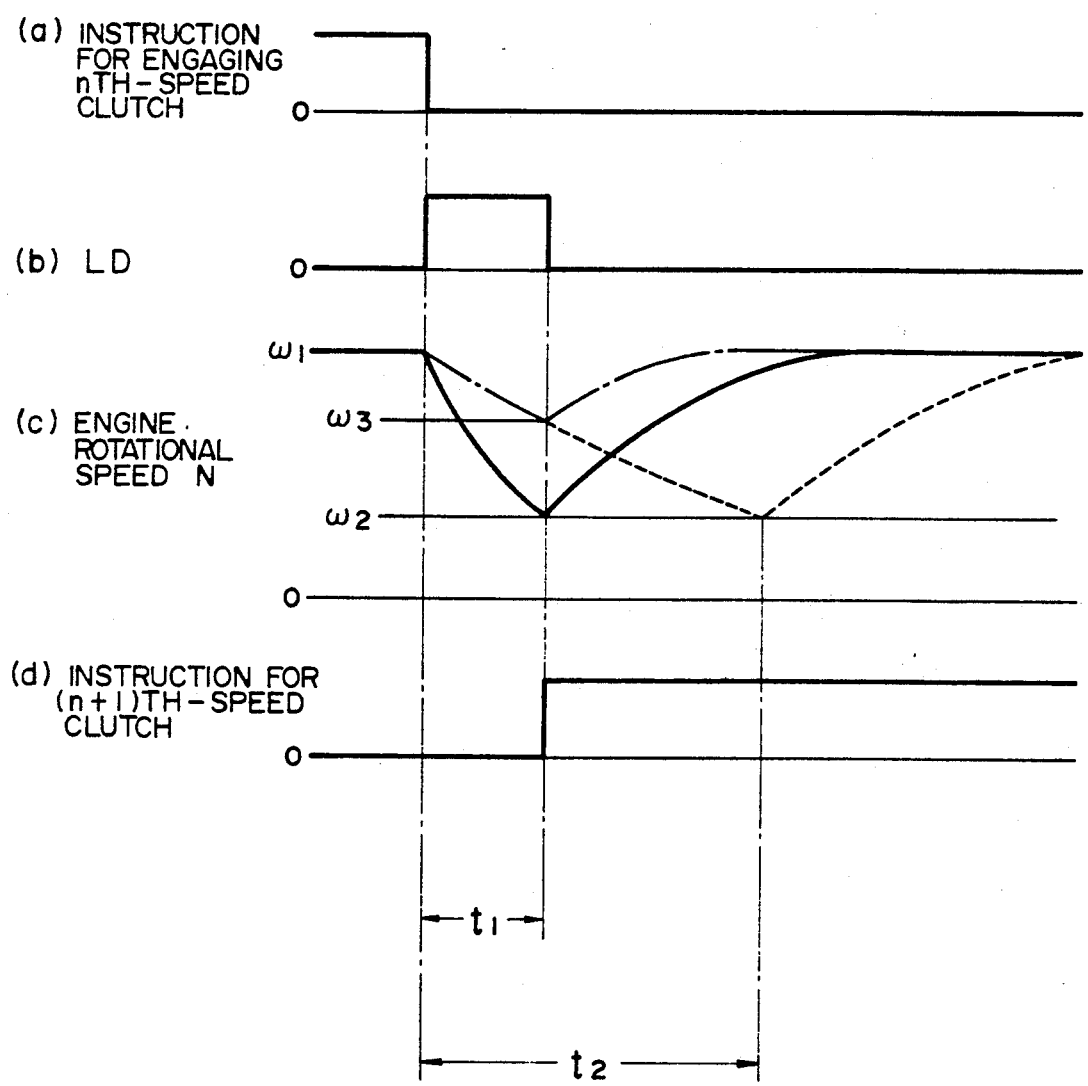
FIG. 6 is a time chart explanatory of the operation of each of the above control apparatuses of the invention.

FIG. 5 shows a fifth embodiment of the invention. A mechanism portion of this embodiment is cross-sectionally shown as in FIG. 4.

The output of an engine 1 is connected to an automatic transmission 2d, and the rotational energy of the engine 1 can also be applied to a flywheel 40 intermediate the engine 1 and the automatic transmission 2d via a clutch 39. When the automatic transmission 2d is to effect a gear shifting-up, a transmission control device 14d feeds a shift control signal SP so as to disengage a clutch now engaged within the automatic transmission 2d. At the same time, the transmission control device 14d feeds a load-applying signal LD to a flywheel control portion 41 for controlling the flywheel 40. Upon receipt of the load-applying signal LD, the flywheel control portion 41 engages the clutch 39, and t the same time loosens a brake 42. As a result, the inertia energy stored in the rotational portion of the engine 1 is consumed to operate the flywheel 40, so that the output rotational speed of the engine 1 is abruptly lowered, thereby reducing a gear-change shock. Immediately after the gear shifting-up is finished, the load-applying signal LD is caused to stop, and as a result the flywheel control portion 41 disengages the clutch 39, and operates the brake 42 to stop the flywheel 40 in preparation for the next gear shifting-up. The clutch 39 and the brake 42 may be of either the electromagnetic type or the hydraulic type, and depending on it, the flywheel control portion 41 employs either an electromagnetic solenoid or an electromagnetic valve.

Unlike the above-mentioned first and second embodiments, the above method of this embodiment does not utilize the load produced by the originally-provided component part of the automobile, and therefore the load-applying portion can always wait for its operation in a stationary condition, and can apply the load when this is required.

Next, the instructions given by the transmission control device 14, 14a, 14b, 14c, 14d as well as the sequential operations effected in response to such instructions in the above first to fifth embodiments will now be described with reference to FIGS. 6(a) to 6(d). Now, the automobile is running by means of the nth shift gear, and in this condition, when the gear-shifting up is to be effected, the instruction for the clutch connected to the nth shift gear is rendered to zero (0) (FIG. 6(a)), and at the same time the load-applying signal LD is applied (FIG. 6(b)). As a result, in the case of the embodiments of FIGS. 1, 4 and 5, the load is applied, and in the case of the embodiments of FIGS. 2 and 3, the load is increased. As a result, the engine rotational speed N is rapidly lowered as indicated in a solid line in FIG. 6(c), and after the time period t1, the engine rotational speed N is reduced to the speed ω2 commensurate with the gear ratio of the (n+1)th shift gear. Therefore, the (n+1)th clutch can be engaged without causing a gear-change shock. On the other hand, in the conventional gear-shifting method, it is impossible to absorb the rotational energy, possessed by the engine, at the time of the gear change, and the rotational speed of the engine can not be abruptly lowered. Therefore, as indicated in a dot-and-dash line in FIG. 6(c), the gear shifting is effected at the rotational speed 3. As a result, there occurs the gear-change shock caused by the rotational energy $\frac{1}{2} \cdot I(\omega 3 - \omega 2)$ corresponding to the difference between the rotational speed ω3 and the target rotational speed ω2. If it is intended to effect the gear shifting without causing such a gear-change shock, the gear shifting must be done for a relatively long time period t2, thus involving the prolonged gear shifting.

In the methods of FIGS. 1 and 5, if the load to be applied is suitably predetermined to a sufficiently large value, the gear change time t1 can be sufficiently shorter than 0.5 seconds. Therefore, though the magnitude of the energy to be absorbed differs depending on the vehicle speed, this can be dealt with by adjusting the gear change time t1.

In the embodiments of FIGS. 2, 3 and 4, since the load to be applied can be suitably controlled, the gear change can be effected during the constant gear change time t1.

What is claimed is:

1. A method of controlling a gear change of an automobile, said automobile comprising an internal combustion engine; an automatic transmission connected to an output rotation shaft of said engine so as to transmit the rotational output of said engine to drive wheels of said automobile through any selected one of a plurality of gear ratios; a load device selectively connectable to said output rotation shaft of said engine via selectively-connecting means; and means for generating a gear change control signal for selecting one of said gear ratios of said automatic transmission in accordance with one of operational conditions of said automobile and said engine; said method comprising the steps of:

controlling said selectively-connecting means when said gear change signal-generating means generates the control signal for shifting up the gear in said automatic transmission, in such a manner that said selectively-connecting means connects said load device to said output rotation shaft of said engine.

2. An automatic gear change control apparatus for an automobile, said automobile comprising an internal combustion engine; an automatic transmission connected to an output rotation shaft of said engine so as to transmit the rotational output of said engine to drive wheels of said automobile through any selected one of a plurality of gear ratios; said apparatus comprising:

a load device for applying a load;

means for connecting said load device to said output rotation shaft of said engine and for generating a gear change control signal for selecting one of said gear ratios of said automatic transmission in accordance with one of operational conditions of said automobile and said engine; and load control means for increasing the load of said load device when said gear change signal-generating means generates the control signal for shifting up the gear in said automatic transmission.

* * * * *